May 26, 1964 E. J. CATOR 3,134,615
TUBE FITTING FOR LARGE DIAMETER TUBING
Filed Oct. 24, 1960 2 Sheets-Sheet 1
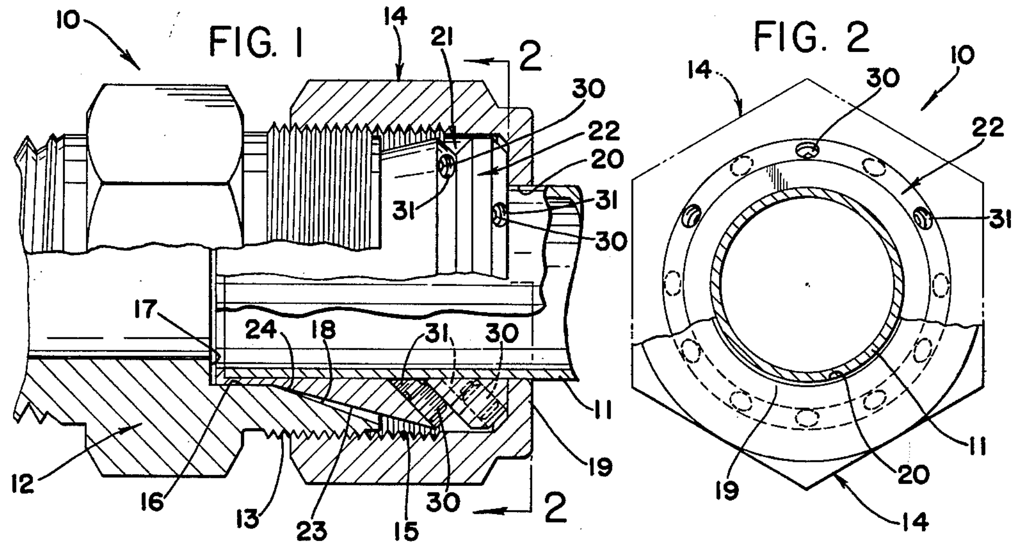
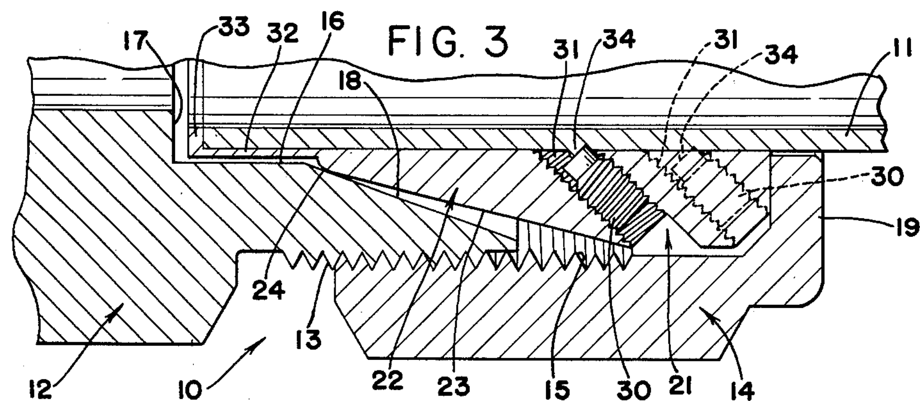
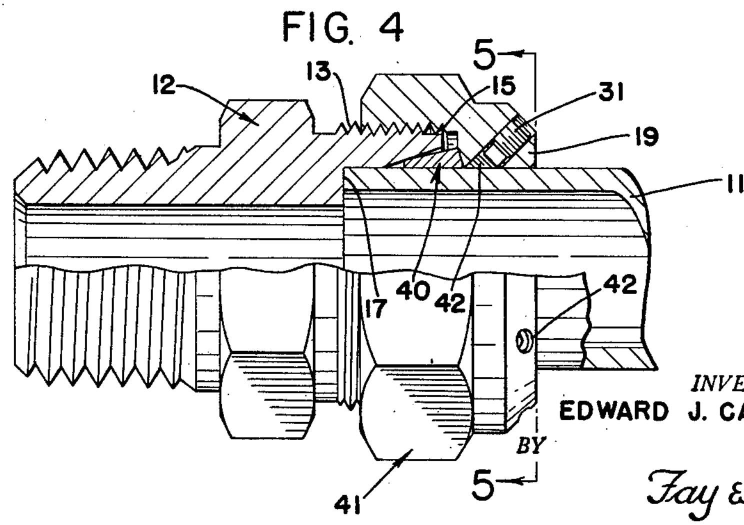
INVENTOR.
EDWARD J. CATOR
BY *Fay & Fay*
ATTORNEYS

TUBE FITTING FOR LARGE DIAMETER TUBING

Filed Oct. 24, 1960 2 Sheets-Sheet 2

INVENTOR.
EDWARD J. CATOR
BY
*Fay & Fay*
ATTORNEYS

United States Patent Office 3,134,615 Patented May 26, 1964

3,134,615
TUBE FITTING FOR LARGE DIAMETER TUBING

Edward J. Cator, Rochester, N.Y., assignor to Crawford Fitting Company, Cleveland, Ohio, a corporation of Ohio Filed Oct. 24, 1960, Ser. No. 64,539
4 Claims. (Cl. 285—341)

This invention relates to a tube coupling means and, more particularly, to a compression fitting having a novel means for anchoring the tube within the fitting.

Compression fittings generally represent a significant improvement over other types of tube coupling fittings. One of the most effective prior art compression fittings of which I am aware is that disclosed in Patent No. 2,484,815 to Crawford and assigned to the assignee of the present invention. Such fittings are particularly suitable for use with large diameter tubing made of either metal or plastic, where it is difficult to tighten the fitting in the field. Some of the primary advantages achieved by compression fittings include improved vibrational damping characteristics and excellent sealing characteristics, while providing a rigid tube coupling. Because of these characteristics, the demand for compression fittings has increased in recent years and the fittings have been put to more and more uses. However, such fittings have proved to have disadvantages at the increasingly higher pressures to which they are subjected.

This invention is directed to a novel means for increasing the holding power of conventional compression fittings of the type disclosed by Crawford at a minimum expense so as to overcome the disadvantages present in prior art fittings while at the same time providing a fitting with greatly improved sealing characteristics.

Accordingly, it is a general object of this invention to provide a compression fitting have a novel means for holding the tubing within the fitting. A related object of this invention is to provide a compression fitting capable of withstanding higher pressures than has heretofore been possible.

A further object of this invention is to provide a novel holding means for a compression fitting wherein the fitting may be repeatedly diassembled and reassembled without endangering the fluid seal. In this connection, it is an object of the invention to provide a compression fitting having a ferrule that is securely anchored to the tubing when the fitting is disassembled and wherein an improved leakproof seal is established between the ferrule and the tubing. A further object of the invention is to provide a novel ferrule and holding means therefor for use in compression fittings and wherein an improved fluid seal is insured.

It is a more specific object of this invention to provide a compression fitting having a plurality of holding elements passing through the fitting in a substantially radial direction so as to engage the tubing and prevent relative movement between the tubing and the fitting. It is another object of the invention to provide a compression fitting having a plurality of holding elements passing through the ferrule wall, each element being axially inclined with respect to a radius thereof, and positioned so as to partially penetrate the tubing when tightened and prevent relative movement between the tubing and the ferrule. An allied object of the invention is to provide a novel holding means which serves to effectuate an improved fluid seal.

Still another object of the invention is to provide a novel holding means that may be selectively tightened after the fitting has been assembled. A correlative object of the invention is to provide a holding means that may be tightened so as to prevent relative movement between the ferrule and the tubing before the fitting is assembled.

These and other objects and advantages of the invention are attained by the construction and arrangement shown by way of illustration in the drawings, in which:

FIG. 1 is a side elevation, partly in section, of a compression fitting in non-response or finger tight contact and disclosing the preferred embodiment of the novel holding means of my invention;

FIG. 2 is an end view, partly in section, taken along the line 2—2 of FIG. 1;

FIG. 3 is an enlarged fragmentary longitudinal section of a partially assembled compression fitting disclosing the holding means of this invention in anchoring engagement with the tubing;

FIG. 4 is a side elevation, partly in section, of a modified form of the invention and disclosing a partially assembled compression fitting in non-pressure contact;

Figure 5:
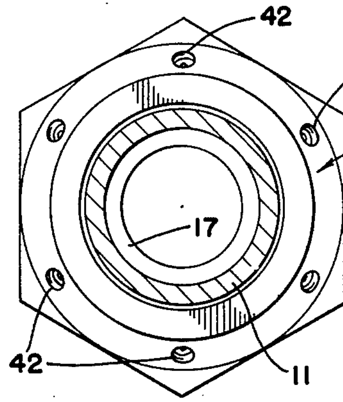
FIG. 5 is an end view, partly in section, taken along the line 5—5 of FIG. 4.

While this invention is susceptible of various modifications and alternative constructions, there is shown in the drawings and will herein be described with particularity a preferred embodiment. However, it is to be understood that it is not thereby intended to cover all modifications and alternative constructions falling within the spirit and scope of the invention as expressed in the appended claims.

Referring more specifically to the drawings, there has been illustrated in FIG. 1 a compression fitting, generally indicated at 10, embodying the preferred form of the invention. The fitting 10 is designed to be mounted on the end of a tube 11 and, to this end, includes a hollow coupling body 12 having an externally threaded portion 13, and a hollow coupling nut 14 having an internally threaded portion 15 designed to cooperate with the threaded body portion 13.

In accordance with conventional practice, the hollow coupling body 12 is provided with an enlarged axial bore 16 at one end thereof designed to receive the end of tube 11. The enlarged bore 16 defines an inwardly extending circumferential radial shoulder 17 which serves as a stop to prevent further inward movement of the tube 11 relative to the coupling body 12. In order to provide a suitable surface for imparting the desired swaging action when assembling the compression fitting, I have provided bore 16 with an outwardly flaring mouth portion 18 having a substantially frusto-conical configuration, as is common practice. Coupling nut 14 is provided with an internally extending, circumferentially disposed, radial flange 19 having an opening 20 therein. The coupling nut is slidably mounted on the tube 11 with the end of the tube passing loosely through opening 20. It will be apparent that the coupling body 12 and coupling nut 14 define a substantially annular chamber 21 which surrounds the end of tube 11.

A hollow ferrule 22 is interposed betwen the coupling body 12 and the coupling nut 14, and is slidably mounted on tube 11 within annular chamber 21. Ferrule 22 is provided with a substantially frusto-conical portion 23 havig an apical end 24 at the forward end thereof. When assembling the fitting coupling nut 14 and ferrule 22 are slidably mounted on the tube 11 with the end of the tube received within bore 16 in coupling body 12. The frusto-conical portion 23 of ferrule 22 is received within the outwardly flared body mouth 18 with the apical end 24 of the ferrule in engagement with the side wall of mouth 18. It will be apparent that tightening of nut 14 with respect to body 12 causes the ferrule 22 to move into the outwardly flared mouth 18 with a swaging action, thus effecting a leakproof seal. While the tube may be slightly deformed by the movement of the ferrule 22 under the tightening action of the nut 14, the result obtained is mainly a sealing action betwen the fitting and the tube wall. Especially when enlarged diameter heavy wall tubing is being used, the ferrule predominantly creates an extremely snug sealing effect. The primary gripping of the tube is obtained through the action of the threaded elements 30.

The coupling arrangement heretofore described forms the basis of the prior Crawford Patent No. 2,484,815, which has been assigned to the assignee of the present invention. As disclosed in the Crawford patent, it has been found that in practice it is desirable that an angular taper difference of approximately 10° be present between the internal tapered surface of the frusto-conical mouth 18 and the external tapered surface of the frusto-conical portion 23 of ferrule 22. It will be understood that by "angular taper difference" it is meant that the total included conical angle of the receiving mouth is greater than the total included conical angle of the frusto-conical portion of the ferrule. Moreover, the Crawford patent discloses that in order to achieve the desired swaging action, the apical end of the ferrule should seat within the flared mouth at a point between one third and one fifth along the axial length of the flared mouth measured from the intersection of the frusto-conical mouth and the inner cylindrical surface of the coupling body.

In accordance with one of the important aspects of the present invention, I provide a novel means for holding a tubing within a compression fitting, the novel means including a plurality of elements which pass through substantially radial openings in the fitting and engage the tubing so as to prevent relative motion between the fitting and the tubing. In the preferred embodiment of my invention, as illustrated in FIGS. 1–3, there are disclosed a plurality of threaded elements 30, for example, socket head set screws, which are threaded into openings 31 formed in ferrule 22. While the openings 31 may extend substantially radially through the ferrule, in practice I have found that excellent results are obtained when the openings are axially inclined with respect to the ferrule radius and are inwardly directed towards the apical end 24 of the ferrule. Thus, when the threaded elements 30 are tightened so as to engage tubing 11, an axial component of force is imparted to the tubing tending to force the tube into the fitting so as to effectuate a leakproof seal.

In the illustrative embodiment of FIGS. 1–3, I have chosen to show two rows of threaded elements which are spaced apart in an axial direction. As has been clearly illustrated in FIG. 2, openings 31 and threaded elements 30 are circumferentially disposed about ferrule 22 with the openings and threaded elements in one circumferential row positioned intermediate those in the adjacent row. I have found that this arrangement provides maximum ferrule strength and greatly increased holding power. Of course, it will be appreciated that the novel holding means of the present invention could be arranged in one row, or in three or more rows if desired.

In carrying out the present invention, I have provided an improved ferrule 22, more clearly illustrated in FIG. 3, which, in the preferred embodiment, is designed to be rigidly secured to the end of tube 11 before the fitting is assembled. This is accomplished by providing a cylindrical portion 32 extending axially forward from the apical end 24 of the frusto-conical portion of the ferrule. An internal radial flange 33 is formed at the forward end of cylindrical portion 32 and serves as a stop to prevent tube 11 from moving inside of the ferrule. It will be apparent that when ferrule 22 is mounted on the end of tube 11 with flange 33 in abutment therewith, and the threaded elements 30 are tightened, they will engage and partially penetrate the wall of tubing 11. Since the threaded elements 30 are axially inclined, tightening thereof causes metal from the wall of tube 11 to be thrown up ahead of the "half-dog" point, as is clearly indicated at 34 in FIG. 3, thereby anchoring the tube within the fitting. Moreover, the angular relation of the threaded elements causes tube 11 to be forced into tight abutment with flange 33, thus effectuating a leakproof fluid seal between the ferrule and the tube. These threaded elements 30, or at least the "dog" points or "half-dog" points should be harder than the tubing. If they are not harder than the tubing, they will be deformed, and the action of thrown up metal in front of the "dog" points will not be accomplished. However, the usual stock shelf screws are of sufficient hardness.

Attention is drawn to the fact that although the threaded elements partially penetrate the tubing wall, the tube is not weakened to an extent endangering the yield strength thereof since the partially penetrated portion of the tube is located beneath the frusto-conical of the ferrule which serves as a backing member to strengthen the tube. Additionally, any tendency to weaken the tube is minimized by staggering the threaded holding elements in axially spaced circumferential rows. Moreover, I have discovered that any tendency of tube 11 to expand in the region of partial penetration actually increases the holding power between the threaded elements and the tubing.

When assembling a compression fitting embodying the preferred form of my invention, coupling nut 14 is slidably mounted on the end of tube 11 and hollow ferrule 22 is then positioned on the tube with flange 33 in abutment with the end of the tube. Threaded holding elements 30 are tightened so as to partially penetrate the tube wall, thus securely anchoring the ferrule to the tube and effectuating a fluid tight seal between the tube and the ferrule. The cylindrical forward extension 32 of the ferrule is then inserted within the enlarged bore 16 of coupling body 12 and nut 14 is tightened, thus causing the frusto-conical portion 23 of the ferrule to move into the flared mouth 18 with a swaging action so as to deform the tube 11 in the vicinity of the apical end 24 of the ferrule. As nut 14 is tightened further, fluid seals are established between flange on the ferrule and shoulder 17 on the coupling body. Moreover, a fluid tight seal is established between the ferrule and the flared mouth.

One of the advantages achieved by the use of the preferred form of the invention resides in the fact that by rigidly anchoring ferrule 22 to tube 11 and providing an effective fluid tight seal therebetween, the fitting may be disassembled and reassembled at any time without damaging either the seal or the holding means. Incidentally, it will be appreciated that the coupling nut 14 will be retained captive upon tube 11 even when the fitting is disassembled, since ferrule 22 is anchored to the tube.

While the invention has been described in connection with a preferred embodiment, one skilled in the art will appreciate that it is not necessarily so limited and that various modifications may be made without departing from its true scope.

Figure 6:
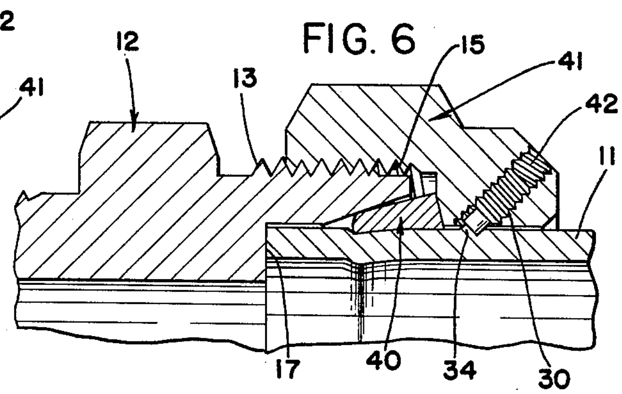
FIG. 6 is an enlarged fragmentary longitudinal section of the modified form of FIG. 4 and disclosing the holding means of my invention in anchoring engagement with the tubing.

For example, a modified form of the invention has been illustrated in FIGS. 4–6 and contemplates utilizing the novel holding means of my invention in conjunction with a compression fitting having a conventional ferrule 40. In the modified construction a coupling nut 41 is provided having a plurality of openings 42 which are circumferentially disposed about the nut and extend therethrough in a manner similar to that described for ferrule openings 31 in FIG. 3. When the modified compression fitting has been assembled, threaded elements 30 are tightened so as to partially penetrate the tubing and securely anchor tube 11 within the fitting. Additionally, the tubing is forced into tight abutment with shoulder 17 in coupling body 12 so as to provide a leakproof seal. Moreover, it will be apparent that coupling nut 41 will tend to reinforce tube 11 in the vicinity of the partially penetrated portion so as to prevent weakening of the tube.

Figure 7:
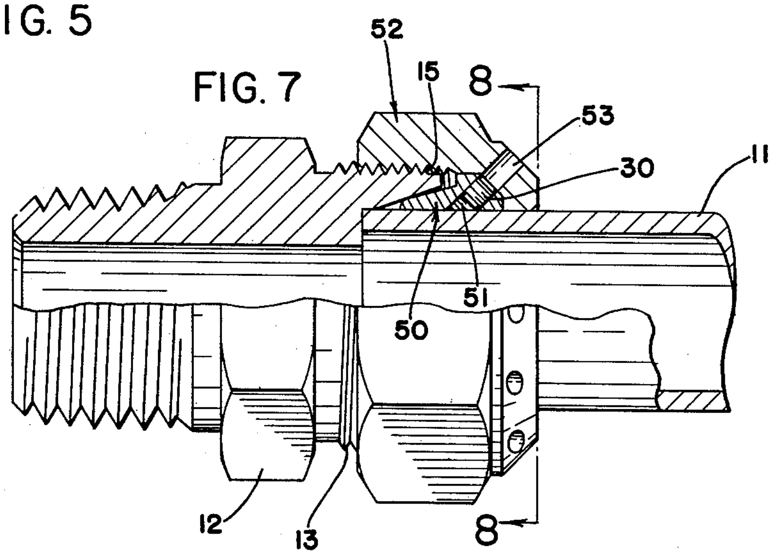
FIG. 7 is a side elevation, partly in section, of a further modification of the invention and disclosing a partially assembled compression fitting in non-pressure contact.
Figure 8:
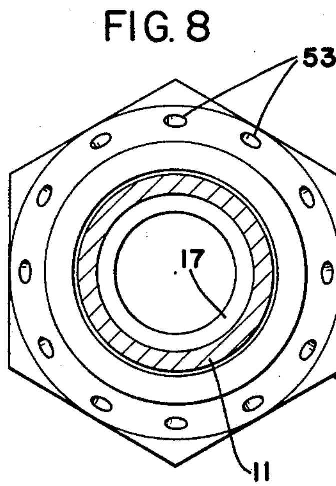
FIG. 8 is an end view, partly in section, taken along the line 8—8 of FIG. 7.
Figure 9:
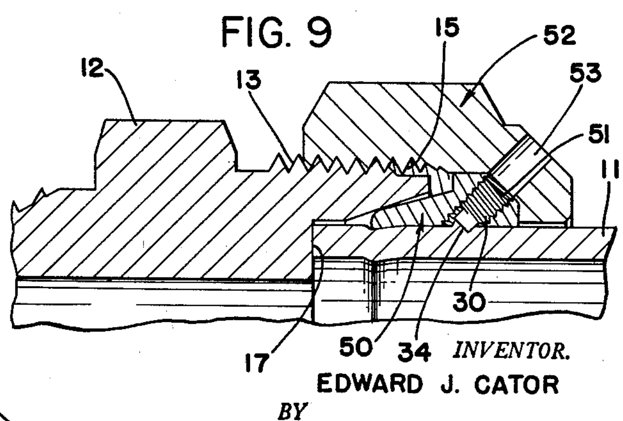
FIG. 9 is an enlarged fragmentary longitudinal section of the modified form of FIG. 7 and disclosing the holding means of my invention in anchoring engagement with the tubing.

A further modification of the invention has been illustrated in FIGS. 7–9. In this embodiment a conventional ferrule 50 is provided with a plurality of openings 51 positioned therein in a manner similar to that described for FIG. 3. Coupling nut 52 is provided with a plurality of openings 53 positioned to register with ferrule openings 51 so as to form extensions thereof. The fitting is assembled in a manner similar to the modifications described heretofore. However, because of the openings 53 in coupling nut 52, the ferrule may be rigidly secured to the tube 11 either before tightening the nut or, alternatively, it may be secured thereto after the fitting is assembled. In the first case, ferrule 50 is positioned on tube 11 and anchored thereto by tightening threaded elements 30 until they partially penetrate the tube. Nut 52 is then tightened, thus driving both the tube and the ferrule into flared mouth 18 in coupling body 12 with a swaging action. In the latter case, the fitting is assembled first and the threaded elements 30 are then tightened to provide an effective means for anchoring the tube within the fitting.

It is evident that I have provided a novel and effective means for increasing the holding power of a compression fitting. The holding means described may be utilized with either conventional ferrules or with the improved ferrule disclosed in the preferred embodiment. Moreover, it will be apparent to those skilled in the art that the invention may be utilized in conjunction with other types of fittings, for example, the multi-ferrule construction disclosed in the prior Crawford patent. It will be understood that the preferred form of my invention could utilize a coupling nut similar to either that employed in FIG. 6 or FIG. 9 so as to allow the holding means to be tightened after the fitting is assembled. Additionally, the modified forms of the invention could utilize axially spaced rows of holding elements, thereby increasing the holding power of the fitting.

It will be appreciated further that I have provided a compression fitting having greatly increased holding power at a minimum of expense, but which is nevertheless capable of withstanding higher pressures than has heretofore been possible with prior art fittings.

While I have chosen to disclose the use of threaded holding elements it will be apparent that other means could be employed for holding the tube within the fitting and still not depart from my invention. Moreover, it will be understood that my novel holding means is not restricted to holding elements that are angularly inclined with respect to the ferrule radius, but is equally applicable for use with elements that are substantially radially disposed, and it is this latter meaning which is intended in the following claims.

I claim:

1. A coupling assembly for a tube end comprising, in combination, a hollow externally threaded coupling body, said body having an enlarged hollow bore adjacent one end thereof and defining an internal radial shoulder within said body, said enlarged bore having an outwardly flaring substantially flat based frusto-conical mouth, a hollow substantially frusto-conical ferrule slidably mounted on said tube end, said ferrule having a plurality of substantially radial openings formed therein and inclined towards the apical end thereof, means extending through said openings and positioned to selectively engage the tube and throw up a portion of the tube wall for anchoring said ferrule to the tube end, and a hollow internally threaded coupling nut slidably mounted on said tube end, said nut having a depending substantially radial internal flange positioned to abut the base of said ferrule for driving said ferrule into said mouth and said tube wall in swaging relationship therewith when said coupling nut is tightened, said nut having a plurality of substantially radial openings extending therethrough and positioned to register with said first named openings for allowing said means to be selectively engaged with the tube when said coupling nut is threaded on said coupling body.

2. A coupling assembly for a tube end comprising, in combination, a hollow externally threaded coupling body, said body having an enlarged hollow bore adjacent one end thereof and defining an internal radial shoulder within said body, said enlarged bore having an outwardly flaring substantially frusto-conical mouth, a hollow substantially smooth bored frusto-conical ferrule slidably mounted on said tube end, said ferrule having a plurality of substantially radial threaded openings formed therein, threaded elements extending through said openings and positioned to selectively engage said tube, said elements partially penetrating said tube when tightened for anchoring said ferrule to the tube end, and a hollow internally threaded coupling nut slidably mounted on said tube end, said nut having a depending substantially radial internal flange positioned to abut the base of said ferrule for driving said ferrule into said mouth and said tube in swaging relationship therewith when said coupling nut is tightened, said nut having a plurality of substantially radial openings extending therethrough and positioned to register with said first named openings for allowing said threaded elements to be selectively engaged with the tube when said coupling nut is threaded on said coupling body.

3. A coupling assembly for a tube end comprising in combination, a hollow externally threaded coupling body, said body having an enlarged hollow bore adjacent one end thereof and defining an internal radial shoulder within said body, said enlarged bore having an outwardly flaring substantially frusto-conical mouth at a first angle with the tube axis, a hollow ferrule slidably mounted on said tube, said ferrule having a smooth bore and a substantially flat based frusto-conical portion at a second angle with the tube axis, said ferrule having a plurality of substantially radial openings formed therein and inclined towards the apical end of said ferrule, means extending through said openings and adapted to engage the tube for anchoring said ferrule to the tube end, and a hollow internally threaded coupling nut slidably mounted on the tube end, said nut having a depending substantially radial internal flange positioned to abut the base of said ferrule for driving said ferrule against said mouth and into swaging sealed relationship with said tube when said coupling nut is threaded on said coupling, said nut further having a plurality of openings extending therethrough and adapted to register with said first-named openings upon adjustment of said nut whereby said means for engaging said tube may be inserted through said registered openings and brought into engagement with said tube.

4. A coupling assembly for a tube end comprising in combination, a hollow externally threaded coupling body, said body having an enlarged hollow bore adjacent one end thereof and defining an internal radial shoulder within said body, said enlarged bore having an outwardly flaring substantially frusto-conical mouth at a first angle with the tube axis, a hollow ferrule slidably mounted on said tube, said ferrule having a smooth bore and a substantially flat based frusto-conical portion at a second angle with the tube axis, said ferrule having a plurality of substantially radial openings formed therein, means threadedly received in said openings and positioned to engage selectively the tube and to deform a portion of the tube wall for anchoring said ferrule to the tube end, and a hollow internally threaded coupling nut slidably mounted on said tube end, said nut having a depending substantially radial internal flange positioned to abut the base of said ferrule for driving said ferrule into said mouth and said tube wall in swaging relationship therewith when said coupling nut is tightened, said nut having a plurality of substantially radial openings extending therethrough and positioned to register with said first-named openings for allowing said means to be inserted through said registered openings and engaged with the tube when said coupling nut is threaded on said coupling body.

References Cited in the file of this patent

UNITED STATES PATENTS

| | | |
|---|---|---|
| 1,600,561 | O'Connor | Sept. 21, 1926 |
| 2,146,100 | Walch | Feb. 7, 1939 |
| 2,484,815 | Crawford | Oct. 18, 1949 |
| 2,534,198 | Guarnaschelli | Dec. 12, 1950 |
| 2,613,959 | Richardson | Oct. 14, 1952 |